United States Patent [19]

Klose

[11] Patent Number: 4,923,211
[45] Date of Patent: May 8, 1990

[54] PASSENGER COVERING FOR MOTOR VEHICLE OR THE LIKE

[75] Inventor: Odo Klose, Wuppertal, Fed. Rep. of Germany

[73] Assignee: Gebr. Happich GmbH, Fed. Rep. of Germany

[21] Appl. No.: 297,611

[22] Filed: Jan. 17, 1989

[30] Foreign Application Priority Data

Feb. 10, 1988 [DE] Fed. Rep. of Germany ....... 3804060

[51] Int. Cl.⁵ .................... B60R 22/14; B60R 27/00
[52] U.S. Cl. ................... 280/727; 280/749; 296/77
[58] Field of Search ............... 280/749, 727; 297/487, 297/465; 296/77, 78.1, 81; 160/23.1

[56] References Cited

U.S. PATENT DOCUMENTS

| | | | |
|---|---|---|---|
| 720,260 | 2/1903 | Kutscher et al. | 296/77 |
| 1,383,730 | 5/1921 | Lavoie | 296/77 |
| 1,432,052 | 10/1922 | Chumbley | 296/77 |
| 1,443,695 | 1/1923 | McKibbin | 296/77 |
| 1,477,031 | 12/1923 | Canning | 296/77 |
| 1,537,887 | 5/1925 | Savage | 296/77 |
| 1,619,725 | 3/1927 | Heller | 296/77 |
| 3,692,327 | 9/1972 | Barrick | 280/749 |
| 4,311,339 | 1/1982 | Heath | 280/749 |

FOREIGN PATENT DOCUMENTS 1797032 9/1956 Fed. Rep. of Germany .

Primary Examiner—Richard A. Bertsch
Attorney, Agent, or Firm—Ostrolenk, Faber, Gerb & Soffen

[57] ABSTRACT

A covering for use in a motor vehicle or the like which is supported on the instrument panel or otherwise in front of a passenger seat. A winding shaft carried on a support receives a blanket which is windable on the shaft and which can be drawn over the passenger on the seat by pulling it off the winding shaft. The blanket passes through the rectangular cross-section of a funnel shaped or tapering guide which folds the edges of the blanket for more compact storage on the winding shaft. A spring or electric motor turns the winding shaft in a direction to normally draw the blanket through the guide and onto the winding shaft.

13 Claims, 1 Drawing Sheet

PASSENGER COVERING FOR MOTOR VEHICLE OR THE LIKE

BACKGROUND AND SUMMARY OF THE INVENTION

The present invention relates to a passenger covering, and specifically to a motor vehicle part, particularly for use in passenger cars.

The object of the present invention is to increase the comfort of a passenger in a motor vehicle, particularly a passenger car, through a motor vehicle part.

The motor vehicle part according to the invention comprises a winding shaft which can be supported within the motor vehicle in front of a passenger seat and which has a blanket, or the like covering, wound on the shaft, which blanket can be wound on and off the shaft.

The invention protects against the cold and increases the comfort of a passenger during travel, for instance, the person sitting next to the driver. However, it can also be used by the driver of the vehicle, for instance during pauses for rest or sleep. The invention is convenient to handle, space-saving in arrangement, and inexpensive to manufacture.

In a preferred embodiment of the invention, the motor vehicle equipment part includes, in addition to the winding shaft and the blanket, a blanket guide having an internal opening which is a funnel shaped or tapering shaped. The edges of the opening fold over each of the lateral edges of the blanket by about 180° upon the rolling up of the blanket through the guide and onto the shaft. The guide opening is preferably of rectangular cross-section. The narrow end of the funnel opening of the guide, that is, the end adjacent the winding shaft, has a width equal to approximately half the width of the blanket.

The shaping of the guide opening permits a relatively wide blanket to be used, which completely covers the body of a passenger. Yet, because the blanket is guided positively by the guide element, which could also be referred to as a folding device, the blanket can be stored in a very small space in the vehicle, folded over and wound up on the winding shaft, since its width is reduced practically by half due to the folding over of its longitudinal edges upon its being rolled up.

The winding shaft may be equipped with a spring which urges the rolling up of the blanket or, alternatively, it may be provided with an electromotive drive that performs that function. Such winding shafts are known, for instance, in the case of window blinds, and they can be obtained as parts ready for installation.

In a further development of the invention, at least the inner wall defining the opening of the guide may be comprised of metal or plastic, which is smooth and/or which is provided with a friction-reducing coating so that the blanket does not become particularly worn or roughened upon rolling and unrolling.

The motor vehicle part of the invention can be adapted to be fastened in or preferably on the bottom of a motor vehicle instrument panel which supports it. However, the part may be arranged at the back of the car seat in front of the passenger to be covered, which is useful for rows of seats in buses, airplanes, ships, and the like. For considerations of space, in such cases, there is an arrangement enabling the guide element to be swung away into a depression, or the like, in the panel or other support when not in use.

Other objects and features of the present invention will become apparent from the following description of the preferred embodiments of the invention considered in conjunction with the accompanying drawings.

DESCRIPTION OF THE PREFERRED EMBODIMENT

Figure 1:
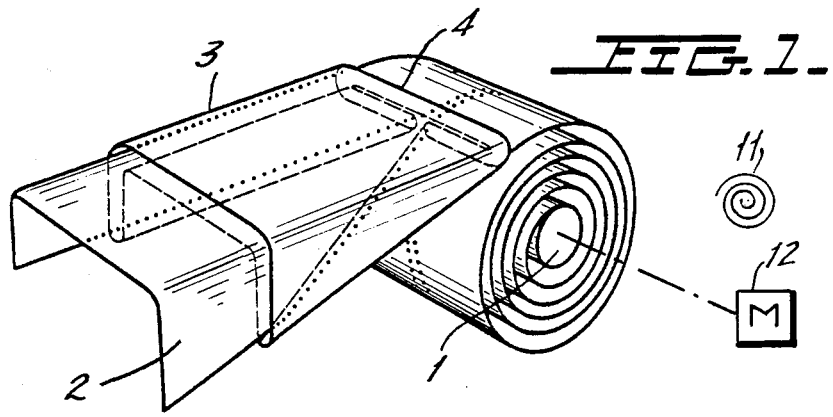
FIG. 1 is an overall view of a motor vehicle equipment part of the invention in perspective.

FIG. 1 shows a motor vehicle equipment part which comprises a winding shaft 1, a blanket 2 which is windable on the shaft, a guide 3 and mounting and support parts (not shown in detail) for the winding shaft 1 and the guide 3. The blanket 2 has one inner longitudinal end fastened to the winding shaft 1 and an opposite outer end for being drawn off the shaft. The blanket also has longitudinally extending lateral edges, which are folded over 180°. A space saving arrangement of the blanket 2 is automatically obtained upon its being rolled up, since it is fastened, with folded over lateral edge regions, to the winding shaft 1 and is suitably positively guided by the guide 3.

The guide 3 has an internal opening with a generally funnel shaped or tapering development, which narrows toward the winding shaft 1. The opening in the guide is of rectangular cross-section along the length of the guide and the opening has a width at the funnel opening 4 adjacent to the winding shaft 1 of about one-half the width of the blanket. The height of the slot of the opening in the region of the funnel opening 4 corresponds approximately to twice the thickness of the blanket. The guide element 3 can be developed with a closed cross-section or, as shown, with a wedge shaped triangular opening on its bottom.

The winding shaft 1 can be equipped, for instance, with a hand crank for rewinding it. Preferably, in order to increase user comfort, rewinding is done with a coil spring drive 11 connected between the support and the shaft and/or with an electric motor drive 12 for winding the shaft 1 to wrap the attached blanket on the shaft.

Figure 2:
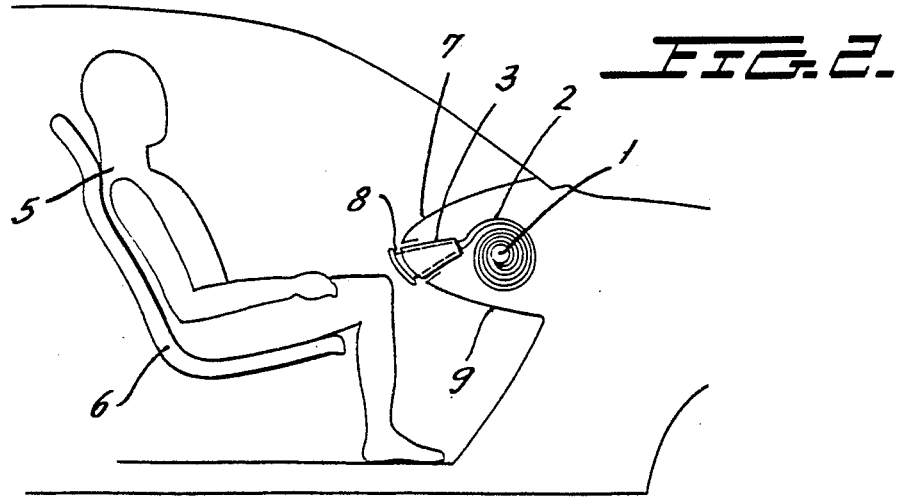
FIG. 2 shows the front passenger side of a passenger car with a built-in motor vehicle equipment part of the invention and a blanket wound up on it.
Figure 3:
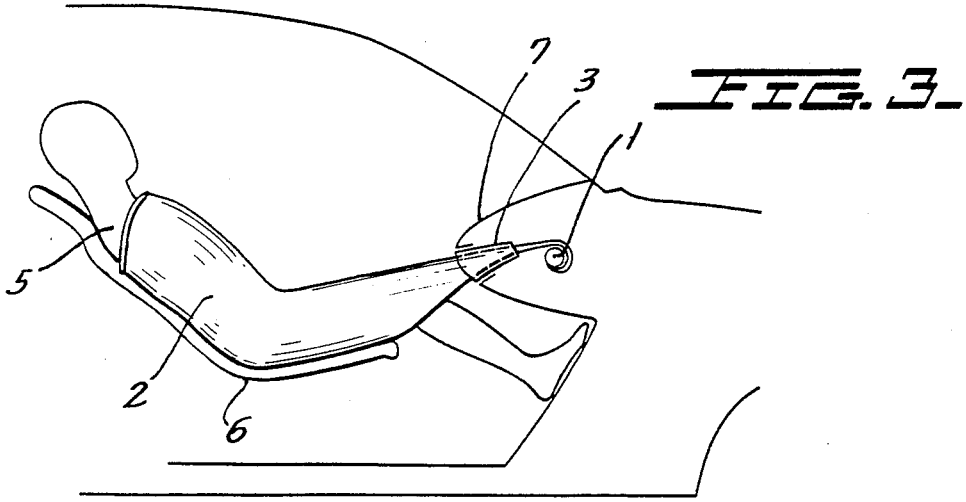
FIG. 3 is a view similar to FIG. 2, with the blanket unwound.

FIGS. 2 and 3 show a front-seat passenger 5 sitting in a customary manner in his seat 6. In front of the passenger 5, there is an instrument panel 7 in which the new motor vehicle equipment part can be received and countersunk. During non-use, as in FIG. 2, the motor vehicle equipment part can be covered by a diaphragm or flap 8 arranged on the instrument panel 7. If there is sufficient leg room, the motor vehicle equipment part can advantageously be arranged on the bottom 9 of the instrument panel 7, particularly in the event it is installed subsequent to its manufacture.

FIG. 3 illustrates the position of the blanket 2 unwound from the winding shaft 1 and protecting the passenger 5. The guide 3 controls the shape of the blanket as it is moved through the guide back onto the winding shaft.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A covering for a person comprising:
    a rotatable winding shaft for being supported upon a support located in front of a seat, and means for rotating the shaft;
    a blanket having a first end on the shaft, the blanket being windable onto the shaft upon winding the shaft in one direction and the blanket being rewindable off the shaft; the blanket having lateral edges and a first width between the lateral edges;
    a blanket guide located toward the support, the guide being shaped for defining an interior of the guide for receiving the blanket, for passing the blanket through the guide and for guiding movement of the blanket toward and away from the winding shaft as the blanket passes through the guide;
    the guide interior having a profile which is generally funnel shaped, narrowing in width at the end thereof toward the shaft; the interior profile of the guide being of a second width narrower than the first width of the blanket and the guide interior profile being shaped for folding over the lateral edges of the blanket thereby narrowing the blanket to be narrower than the first width thereof as the blanket is moved through the guide toward the shaft while the blanket is being wound upon the shaft; and
    means for rotating the shaft for winding the blanket on the shaft.

2. The covering of claim 1 for a person in a vehicle, wherein the vehicle includes a seat for a person and the support is disposed in front of the seat, for enabling unwinding of the blanket from the shaft and drawing of the blanket back over the seat.

3. The covering of claim 1, wherein the interior profile is shaped for folding over each of the lateral edges of the blanket in a fold of about 180°.

4. The covering of claim 1, wherein the interior profile comprises an opening or rectangular cross-section through which the blanket is guided.

5. The covering of claim 4, wherein at the end of the guide toward the shaft, the funnel shaped opening narrows to a width of about one-half the width of the blanket.

6. The covering of claim 1, wherein the means for rotating the shaft comprises a spring on the shaft directed for normally biasing the shaft to wind the blanket onto the shaft.

7. The covering of claim 1, wherein the means for rotating the shaft comprises an electric motor drive selectively operable for rotating the shaft for winding the blanket on the shaft.

8. The covering of claim 1, wherein the interior of the guide comprises a wall having smooth, friction reducing coating.

9. The covering of claim 8, wherein the wall of the guide is comprised of metal.

10. The covering of claim 8, wherein the wall of the guide is comprised of plastic.

11. In combination, a vehicle including a support therein and the covering of claim 1, wherein the shaft is supported to the vehicle support.

12. The combination of claim 11, wherein the support in the vehicle comprises an instrument panel and the winding shaft is supported to the instrument panel.

13. The combination of claim 11, wherein the vehicle includes a seat and the support is disposed in front of the seat for unwinding the blanket from the support and drawing the blanket back over the seat.

* * * * *